[2,795,738]
[Patented June 11, 1957]

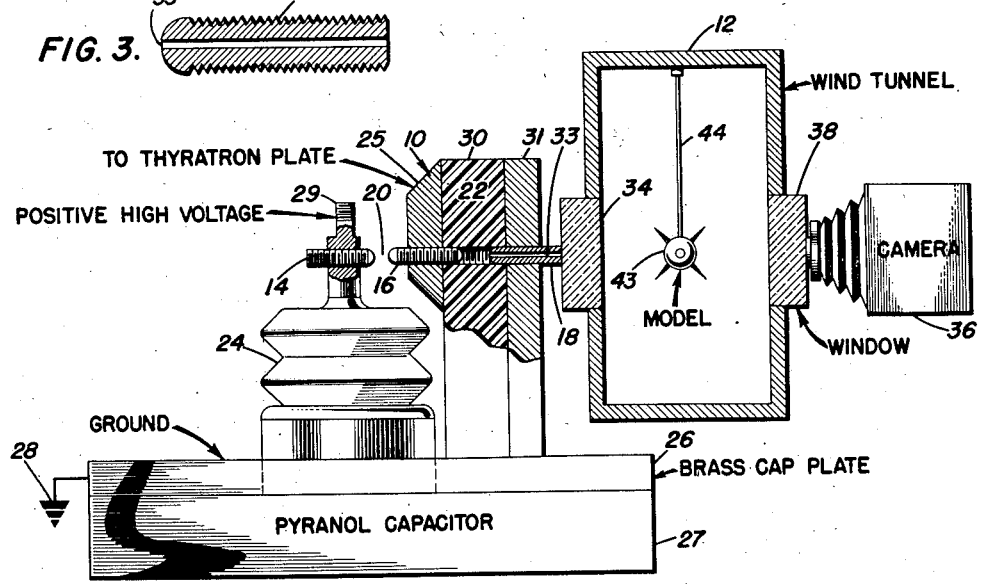

United States Patent Office

2,795,738
SHORT DURATION, HIGH INTENSITY SPARK GAP ARRANGEMENT

Clyde T. Holliday, Silver Spring, Md., assignor to the United States of America as represented by the Secretary of the Navy Application June 30, 1952, Serial No. 296,451

2 Claims. (Cl. 315—188)

This invention relates generally to wind tunnels for studying aerodynamic phenomena, and more particularly to a short duration, high intensity spark providing a light source for investigating flow patterns at supersonic speeds.

In the study of flow patterns at supersonic speeds in wind tunnel applications, a short duration, high intensity spark is required. In order to obtain the desired intensity of spark, either a large capacitor or high voltage must be used. Since a spark of short duration is required in investigations of this type, a large capacitor is not necessary. However, a short duration spark of high intensity can be obtained by using a 0.12 mfd. capacitor charged to 15,000 volts D. C.

It is one of the objects of this invention to provide a short duration, high intensity spark unit employing a hollow electrode for permitting traverse of light.

Another object of this invention is to provide a spark unit that will enable investigators to study flow patterns and other aerodynamic phenomena at supersonic speeds in wind tunnels.

Still another object of this invention is to provide a unique control circuit for a spark unit which can be efficiently used for controlling the spark unit, and which is simple and reliable in operation.

Other objects and many of the attendant advantages of this invention will be readily appreciated as the same becomes better understood by reference to the following detailed description when considered in connection with the accompanying drawings wherein:

Fig. 1 shows a control circuit system embodying some features of the invention;

Fig. 2 is a sectional view partly in elevation of a wind tunnel and a camera, and including the spark unit of the present invention; and Fig. 3 is an enlarged detail section of the hollow electrode for permitting traverse of light.

In accordance with the invention, a spark gap unit is placed adjacent a cooperating wind tunnel, with a hollow electrode directed toward an observation window in the tunnel. A recording camera is then positioned at a second window in the tunnel directly opposite the first window. A model to be studied is then suspended centrally in the wind tunnel between the two windows.

A capacitor in a control circuit is then charged to a value of 15,000 volts or less. This capacitor is connected in parallel with a first spark gap and a first resistor bank. Then a thyratron is caused to conduct by applying a positive voltage to its control grid through a trigger circuit. The thyratron is connected in parallel with a second resistor bank and a second spark gap so that the voltage appearing across this arrangement decreases while the voltage in the first resistor bank and first spark gap increases to a value providing a discharge across this first gap. This then puts a full voltage across the second gap, which, in turn, discharges. This second gap is used as a source of light, through the opening in the electrode, from which shadowgraphs of a phenomena occurring in the tunnel are recorded by camera.

Referring now to the drawings, there is shown in Fig. 2 a spark gap unit 10 which is placed adjacent to a cooperating wind tunnel 12. Spark gap unit 10 includes three electrodes 14, 16, and 18, having provided therebetween two spark gaps 20 and 22. Electrodes 14, 16 and 18 consist of screws having polished spherical ends. Electrode 14 is mounted at the top of a conducting member 29, which has an insulator 24 surrounding its lower portion. Insulator 24 is mounted on a brass cap plate 26 which, in turn, is positioned on a pyranol capacitor 27 having 0.12 mfd. capacity and 15,000 volts direct current rating. This capacitor 27 has one terminal electrically connected to plate 26, and said plate is grounded at 28. A positive high voltage terminal 29 is connected, through insulator 24, to the remaining capacitor terminal and supports electrode 14. Electrodes 16 and 18 are supported by insulating stand 30 which has on one side thereof a terminal plate 25 for connection to the anode of a hydrogen thyratron 32, as will be explained more fully hereinafter, and on the other side thereof a conducting member 31. Stand 30 is mounted on cap plate 26.

The electrode 18, as best seen in Fig. 3, is provided with a central bore 33, which is directed toward a first observation window 34 in wind tunnel 12. A recording camera 36 is positioned at a second window 38 directly opposite window 34. A model 43, which is to be studied, is suspended by member 44 and is located centrally in the wind tunnel 12 between observation windows 34 and 38.

Referring now to Fig. 1, there is shown here a schematic of the electrical control system of the spark unit 10 illustrated in Fig. 2. This electrical control system comprises a bias voltage supply 40 connected by lead 41 to the grid 42 of hydrogen thyratron 32. Positive trigger pulses from a suitable source, such as a battery 46, are applied to grid 42 through lead 45.

Thyratron 32 has its anode 131 and its cathode 48 connected by leads 49 and 50 to the terminals 51 and 52 of electrodes 16 and 18 which have spark gap 22 located therebetween. A resistor 54 is connected in parallel with the anode and cathode of the thyratron 32 by leads 56 and 58.

Capacitor 27 is connected to the terminals 52 and 62, for electrodes 18 and 14, by leads 64 and 66, with electrodes 14 and 16 having the spark gap 20 located therebetween. The terminal 62 of electrode 14 is then connected to the positive high voltage terminal of a high voltage power source (not shown) by lead 68. The negative terminal of the high voltage source is grounded. A resistor 70 is then connected between leads 49 and 68 by means of leads 72 and 74, and in parallel with the anode 131 of the hydrogen thyratron 32 and the positive high voltage terminal.

Capacitor 27 has a capacity of 0.12 mfd., and it is rated at 15,000 volts direct current. The resistors 54 and 70 may each consist of a series connected bank of ten (10) five (5) megohm one (1) watt resistors, so that the combined resistance of both banks is 100 megohms.

In operation, the spark gap unit 10 is placed adjacent the cooperating wind tunnel 12, substantially as shown in Fig. 2, with the electrode 18 directed toward the observation window in said tunnel. The recording camera 36 is positioned at window 38 in the tunnel 12 directly opposite window 34. The model 43 to be observed is then suspended centrally in the wind tunnel between windows 34 and 38.

Capacitor 27 is charged to a value of fifteen (15) kv. by the high voltage power source (not shown), and the thyratron 32 is caused to conduct by applying a positive voltage to its control grid 42 through lead 45. The anode and cathode of the thyratron 32 are in parallel with the resistor bank 54 and the gap 22, so that the voltage appearing across this combination drops while the voltage across resistor 70 and gap 20 increases to a value providing a discharge across the gap 20. This puts the full voltage across gap 22 which, in turn, then discharges. This second spark at gap 22 is then used as a source of light, through the bore 33 in the electrode 18, from which light source shadowgraphs of the phenomena occurring in the tunnel 12 are recorded by the camera 36.

Oviously many modifications and variations of the present invention are possible in the light of the above teachings. It is therefore to be understood that within the scope of the appended claims the invention may be practiced otherwise than as specifically described.

What is claimed is:

1. A high intensity, short duration spark light source comprising, a first electrode, a second electrode, a third electrode, said electrodes being arranged in series circuit relationship and spaced from one another to provide a first spark gap between said first and second electrodes and a second spark gap between said second and third electrodes, a block of dielectric material for receiving said second and third electrodes and confining the spark generated in the gap therebetween, said third electrode being provided with a bore therethrough to allow the traverse of light from the confined spark, a capacitor connected between said first and third electrodes, a source of high voltage connected between said first and third electrodes, a voltage divider including a first resistor and a second resistor connected in series and connected between said first and said third electrodes, a conductor from said second electrode to the junction of said first and second resistors, a variable impedance connected from the junction of said first and second resistors to said third electrode, and means for varying said impedance from a relatively high value to a relatively low value thereby causing a sudden increase in the potential across said first gap and arcing across said first gap and subsequent arcing across said second gap, the arcing across said second gap producing an instantaneous and intense source of illumination.

2. Apparatus as claimed in claim 1 wherein said variable impedance comprises a thyratron having its anode connected to the junction of said first and second resistors and its cathode connected to said third electrode, and said means for varying said impedance comprises a source of positive voltage connectable to the control grid of said thyratron to render said thyratron conductive.

References Cited in the file of this patent

UNITED STATES PATENTS

| | | |
|---|---|---|
| 1,877,713 | Beck | Sept. 13, 1932 |
| 1,954,958 | Smythe | Apr. 17, 1934 |
| 1,975,768 | Case | Oct. 9, 1934 |
| 1,992,267 | Weinhart | Feb. 26, 1935 |
| 2,002,551 | Schmierer | May 28, 1935 |
| 2,107,399 | Spencer | Feb. 8, 1938 |
| 2,354,696 | Mettler | Aug. 1, 1944 |
| 2,362,235 | Barnes | Nov. 7, 1944 |
| 2,434,029 | Williams | Jan. 6, 1948 |
| 2,456,116 | Enns | Dec. 14, 1948 |
| 2,478,907 | Edgerton | Aug. 16, 1949 |

OTHER REFERENCES

Boden: "N. A. Supersonic Wind Tunnel for Testing up to 4000 M. P. H.," pages 36, 37, 38 in Automotive Industries for April 1, 1949.